(12) United States Patent
Milz et al.

(10) Patent No.: US 10,692,284 B2
(45) Date of Patent: Jun. 23, 2020

(54) METHOD AND VEHICLE CONTROL SYSTEM FOR PRODUCING IMAGES OF A SURROUNDINGS MODEL, AND CORRESPONDING VEHICLE

(71) Applicant: Conti Temic microelectronic GmbH, Nuremberg (DE)

(72) Inventors: Stefan Milz, Sallburg-Ebersdorf (DE); Georg Arbeiter, Kueps (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/310,907

(22) PCT Filed: Jun. 20, 2017

(86) PCT No.: PCT/DE2017/200055
§ 371 (c)(1),
(2) Date: Dec. 18, 2018

(87) PCT Pub. No.: WO2018/001422
PCT Pub. Date: Jan. 4, 2018

(65) Prior Publication Data
US 2019/0325650 A1    Oct. 24, 2019

(30) Foreign Application Priority Data

Jun. 27, 2016    (DE) .................. 10 2016 211 453

(51) Int. Cl.
*G06T 19/00*    (2011.01)
*H04N 5/225*    (2006.01)

(52) U.S. Cl.
CPC .......... *G06T 19/003* (2013.01); *H04N 5/2253* (2013.01); *G06T 2200/04* (2013.01); *G06T 2200/08* (2013.01)

(58) Field of Classification Search
None
See application file for complete search history.

(56) References Cited

U.S. PATENT DOCUMENTS

| 2011/0032357 | A1 | 2/2011 | Kitaura et al. |
| 2011/0261050 | A1 | 10/2011 | Smolic et al. |
| 2014/0214260 | A1 | 7/2014 | Eckert et al. |
| 2014/0278049 | A1 | 9/2014 | Grewe et al. |

FOREIGN PATENT DOCUMENTS

WO    WO 2013/060323    5/2013

OTHER PUBLICATIONS

English translation of the International Search Report of the International Searching Authority for International Application PCT/DE2017/200055, dated Sep. 25, 2017, 2 pages, European Patent Office, HV Rijswijk, Netherlands.

(Continued)

*Primary Examiner* — Nicholas R Wilson
(74) *Attorney, Agent, or Firm* — W. F. Fasse

(57) ABSTRACT

In a method of generating continuous images of a stored three-dimensional surroundings model of a vehicle, a camera image is generated and projected onto a projection surface in the surroundings model, and continuous images of the projection surface are generated and output by a mobile virtual camera.

16 Claims, 3 Drawing Sheets

(56) References Cited

OTHER PUBLICATIONS

PCT International Preliminary Report on Patentability including English Translation of PCT Written Opinion of the International Searching Authority for International Application PCT/DE2017/200055, dated Jan. 1, 2019, 7 pages, International Bureau of WIPO, Geneva, Switzerland.

German Search Report for German Patent Application No. 10 2016 211 453.0, dated May 22, 2017, 10 pages, German Patent and Trademark Office, Muenchen, Germany, with partial English translation, 7 pages.

Seiya Shimizu et al., "Wraparound View System for Motor Vehicles", Fujitsu Scientific and Technical Journal, vol. 46, No. 1, Jan. 1, 2010, XP055349887, ISSN: 0016-2523, pp. 95 to 102.

Adel Ahmed et al., "Automatic Camera Path Generation for Graph Navigation in 3D", Advances in Ontologies, Australian Computer Society, Inc., Darlinghurst, NSW 2010 Australia, Jan. 1, 2005, XP058214471, ISSN: 1445-1336, ISBN: 978-1-920682-36-1, pp. 27 to 32.

Suehiro Kawanishi, "Automotive Graphics SoC for 360° Wraparound View System", FUJITSU Scientific and Technical Journal, vol. 49, No. 1, Jan. 1, 2013, XP055406438, retrieved from the Internet: URL:https://www.fujitsu.com/global/documents/about/resources/publications/fstj/archives/vol49-1/paper14.pdf, pp. 91 to 96.

Christophe Lino et al., "Intuitive and Efficient Camera Control with the Toric Space", ACM Transactions on Graphics—Proceedings of ACM SIGGRAPH 2015, vol. 34, pp. 82:1 to 82:12.

Fabio Marton et al., "IsoCam: Interactive Visual Exploration of Massive Cultural Heritage Models on Large Projection Setups", ACM Journal on Computing and Cultural Heritage (JOCCH)—Special Issue on Interacting with the Past, ACM vol. 7, No. 2, Article 12, New York, Jun. 2014, pp. 12:1 to 12:24.

Ken Shoemake, "Animating Rotation with Quaternion Curves", Proceedings of the 12th Annual Conference on Computer Graphics and Interactive Techniques, SIGGRAPH 1985, pp. 245 to 254.

METHOD AND VEHICLE CONTROL SYSTEM FOR PRODUCING IMAGES OF A SURROUNDINGS MODEL, AND CORRESPONDING VEHICLE

FIELD OF THE INVENTION

The present invention relates to a method and to a vehicle control system for a vehicle for generating continuous images of a stored three-dimensional surroundings model of a vehicle and to a vehicle.

BACKGROUND INFORMATION

Surroundings models for vehicles, as known for instance from WO 2013/060323 A1, provide information about objects in a vehicle's environment and thereby enable a driver or a driver assistance system to identify areas suitable for traffic. Using virtual cameras, images of sub-areas of the surroundings model may be generated and displayed to the driver on a vehicle display.

It may often be advantageous to change between different views, for instance in order to obtain a better overview when reversing or making a blind turn. However, simple interpolation between a first virtual camera in the surroundings model and a second virtual camera in the surroundings model may mean that the orientation of the virtual camera on the interpolation path points in an unfavorable direction. In particular, image information may be lacking in such a direction, such that display is no longer possible and the method cannot be executed.

SUMMARY OF THE INVENTION

It is therefore an object of the invention to generate continuous images of a surroundings model, wherein said undesired orientations of the virtual camera are avoided.

This object can be achieved by a method of generating continuous images of a stored three-dimensional surroundings model of a vehicle having the features set forth herein, by a vehicle control system of a vehicle for generating continuous images of a stored three-dimensional surroundings model of the vehicle having the features set forth herein, and by a vehicle having the features set forth herein.

According to a first aspect, the invention accordingly provides a method for generating continuous images of a stored three-dimensional surroundings model of a vehicle. At least one camera image is generated by a camera device of the vehicle and the generated camera image is projected onto a projection surface in the stored three-dimensional surroundings model of the vehicle. By means of a virtual camera movable in the surroundings model, continuous images of the projection surface are generated and the generated continuous images output. The virtual camera in this case comprises a set of camera parameters, the elements of which comprise a camera position of the virtual camera and an optical axis of the virtual camera. Along a first motion path in the surroundings model, the set of camera parameters of the virtual camera is interpolated between a predetermined first set of camera parameters and a second set of camera parameters. Moreover, the set of camera parameters of the virtual camera is interpolated continuously along a second motion path in the surroundings model between the second set of camera parameters and a predetermined third set of camera parameters. The optical axis of the virtual camera which is an element of the second set of camera parameters is determined in such a way that it runs through a predetermined axis point which lies on a connecting line between a first reference point and a second reference point. The first reference point is a predetermined point of that optical axis of the virtual camera which is an element of the first set of camera parameters. The second reference point is a predetermined point of that optical axis of the virtual camera which is an element of the third set of camera parameters.

An image of the surroundings model is understood to mean an image of a specific spatial sub-area of the surroundings model generated by means of the virtual camera, wherein the image is dependent on the position and orientation of the virtual camera.

The projection surface is understood to mean a two-dimensional hypersurface in the three-dimensional surroundings model which may be shaped and curved as desired. The projection surface may for example be a flat plane, a segment of a spherical shell, a cylindrical surface or a paraboloid or hyperboloid surface.

The optical axes extend from the corresponding camera position in the capture direction of the virtual camera. The optical axes of the first and third sets of camera parameters are preferably oriented onto the projection surface.

The invention makes it possible, using the first and third sets of camera parameters, to predetermine an initial and end position of the virtual camera with corresponding orientations, between which interpolation is performed continuously. In this respect, an additional intermediate point is defined by the second set of camera parameters, such that the interpolation path is divided into the first and second motion paths. The camera parameters predetermined at the intermediate point are selected in such a way by the design according to the invention that the orientation of the virtual camera is prevented from changing during interpolation in such a way that it is oriented towards an area of the surroundings model which cannot be displayed or is not provided with image information. The method according to the invention thus enables the generation of continuous images. The method according to the invention increases safety, since correct and uninterrupted, i.e. continuous images may be displayed to the driver and the driver may in this way assess the road situation better. The method is particularly advantageous when combined with a driver assistance system which controls the vehicle partially or wholly autonomously and is therefore dependent on correct information about the surrounding environment.

According to a preferred further development of the method, the first motion path and second motion path describe a segment of a circle. Particularly simple interpolation of the camera parameters is thereby enabled.

According to a preferred further development of the method, interpolation of the camera position of the mobile virtual camera along the first motion path and/or along the second motion path is performed by spherical linear interpolation (SLERP).

According to a further preferred embodiment of the method, interpolation of the optical axis of the mobile virtual camera along the first motion path and/or along the second motion path is performed by spherical linear interpolation (SLERP).

According to a further embodiment of the method, the camera position, which is an element of the second set of camera parameters, lies in a middle third of the circle segment and in particular at a midpoint of the circle segment. In this way, the length of the first motion path is substantially equal to the length of the second motion path, so enabling natural and uniform interpolation.

According to a preferred further development of the method, the distance between the first reference point of that camera position which is an element of the first set of camera parameters is substantially equal to the distance between the second reference point of that camera position which is an element of the third set of camera parameters. It is thus guaranteed that the optical axis at the point of transition from the first motion path to the second motion path, which is formed by the optical axis of the second set of camera parameters, is oriented in the correct direction.

According to a preferred further development of the method, the predetermined connection point lies substantially in the middle of the connecting line between the first reference point and the second reference point.

According to a preferred further development of the method, a driver assistance system controls a function of the vehicle on the basis of the output continuous images. The vehicle functions may include driving and activation or deactivation of actuators, such as for instance blinkers or side mirrors, or indeed semi-autonomous or autonomous acceleration, braking or steering of the vehicle.

According to a preferred further development of the method, the output continuous images are displayed to a driver of the vehicle on a display device.

According to a second aspect, the invention relates to a vehicle control system of a vehicle for generating continuous images of a stored three-dimensional surroundings model of the vehicle. The vehicle control system comprises a camera device of the vehicle for generating at least one camera image and a computing device. The computing device is configured to project the generated camera image onto a projection surface in the stored three-dimensional surroundings model of the vehicle, and to generate continuous images of the projection surface by means of a mobile virtual camera. The vehicle control system further comprises an output device which is configured to output the generated continuous images. The virtual camera has a set of camera parameters, the elements of which comprise a camera position of the virtual camera and an optical axis of the virtual camera. The computing device is moreover configured to interpolate the set of camera parameters along a first motion path in the surroundings model continuously between a predetermined first set of camera parameters and a second set of camera parameters. The computing device is moreover configured to interpolate the camera parameters of the virtual camera continuously between the second set of camera parameters and a predetermined third set of camera parameters along a second motion path in the surroundings model. The computing device is moreover configured to determine that optical axis of the virtual camera which is an element of the second set of camera parameters in such a way that it runs through a predetermined axis point which lies on a connecting line between a first reference point and a second reference point. The first reference point is here a predetermined point of that optical axis of the virtual camera which is an element of the first set of camera parameters. The second reference point is moreover a predetermined point of that optical axis of the virtual camera which is an element of the third set of camera parameters. The computing device is preferably configured to determine the axis point, the first reference point and the second reference point.

According to a preferred embodiment of the vehicle control system, the first motion path and second motion path describe a segment of a circle in the surroundings model.

According to a preferred embodiment of the vehicle control system, the computing device is configured to interpolate the camera position of the mobile virtual camera along the first motion path and/or along the second motion path by spherical linear interpolation (SLERP).

According to a further preferred embodiment, the vehicle control system comprises a driver assistance system which is configured to control a function of the vehicle on the basis of the output continuous images.

According to a further preferred embodiment, the output device comprises a display device which is configured to display the output continuous images to a driver of the vehicle.

According to a third aspect, the present invention relates to a vehicle with a vehicle control system.

BRIEF DESCRIPTION OF THE DRAWINGS

The present invention is explained in greater detail on the basis of the exemplary embodiments indicated in the schematic figures which make up the drawings, in which.

DETAILED DESCRIPTION OF EXAMPLE EMBODIMENTS OF THE INVENTION

Figure 1:
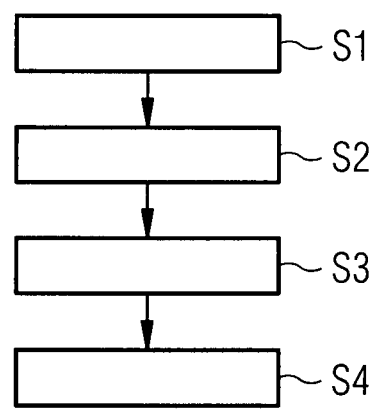
FIG. 1 shows a flow chart for explaining a method for generating continuous images of a stored three-dimensional surroundings model of a vehicle according to one embodiment of the invention.

In all the figures, identical or functionally identical elements and devices are provided with the same reference numerals. The method steps are numbered for the purpose of clarity and are not intended in particular to imply any chronological order. For instance, a number of method steps may be carried out simultaneously. Insofar as it is meaningful, different embodiments may be combined together as desired.

FIG. 1 shows a flow chart for explaining a method for generating continuous images of a stored three-dimensional surroundings model of a vehicle according to one embodiment of the invention.

Figure 2:
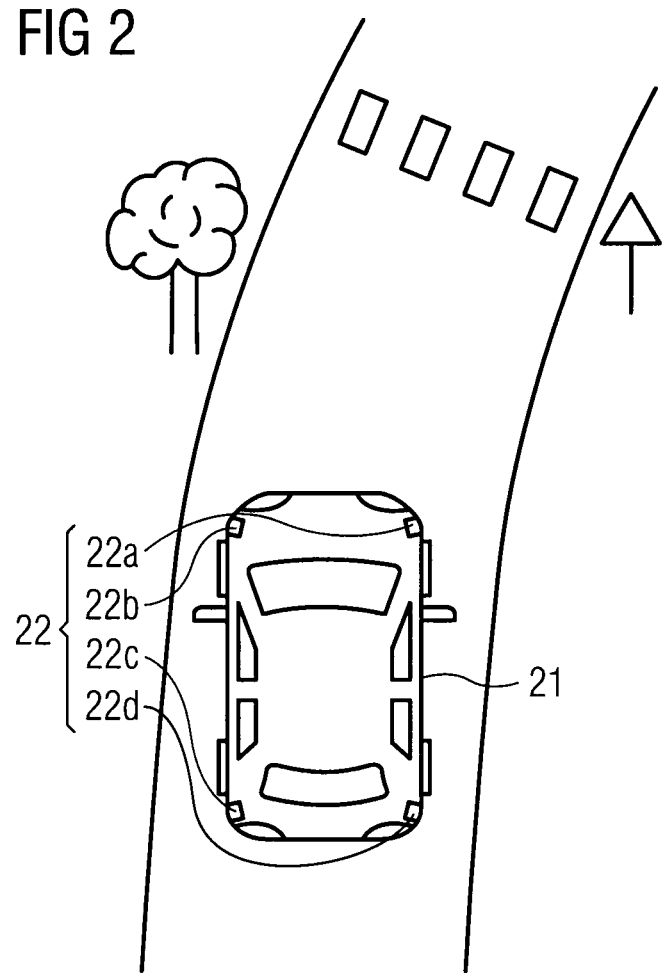
FIG. 2 shows a plan view onto an example of a scenario for explaining the method according to the invention.

FIG. 2 illustrates a scenario showing a plan view onto a vehicle 21 with a camera device 22. The camera device 22 of the vehicle 21 comprises a plurality of vehicle cameras 22a to 22d which are arranged around the vehicle 21 and enable a surround view.

In a first method step S1, at least one camera image is generated by the camera device 22 of the vehicle 21.

Figure 3:
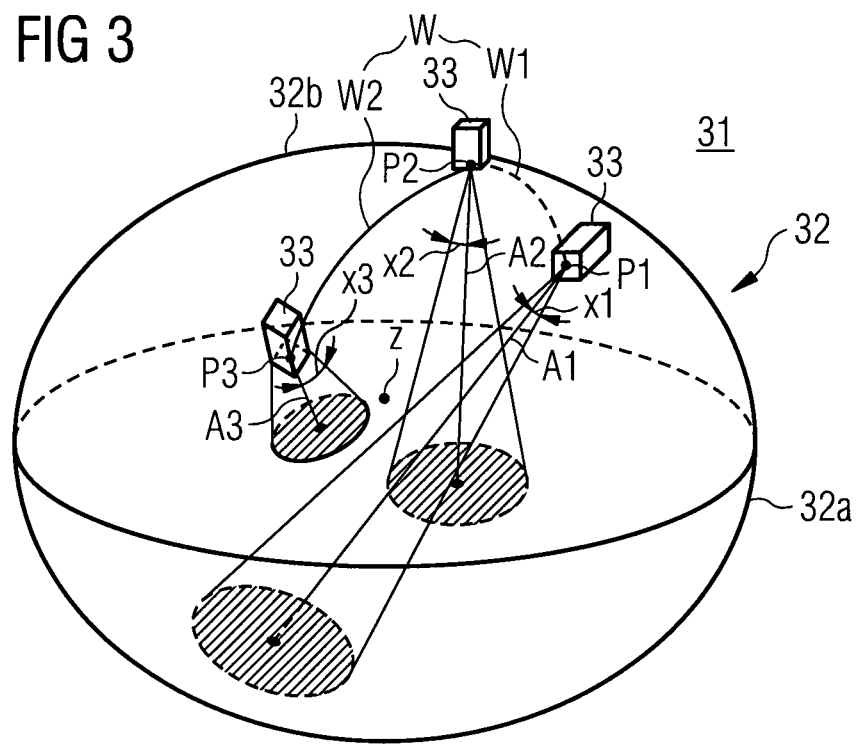
FIG. 3 shows a schematic oblique view of a surroundings model.

Moreover, a three-dimensional surroundings model 31 illustrated in FIG. 3 is provided in which a two-dimensional projection surface 32a is defined. The projection surface 32a may for example represent a flat hyperplane or a cylindrical surface in the surroundings model 31. The projection surface 32a preferably corresponds to a bowl-shaped lower hemisphere of a sphere 32 depicted in FIG. 3. In the surroundings model 31, a spatial position of the vehicle 21 preferably corresponds to a center z of the sphere 32.

In a further method step S2, the generated camera image is projected onto the projection surface 32a. If the at least one camera image forms a surround view of the vehicle environment, then the at least one camera image is projected onto the entire projection surface 32a. According to one embodiment, however, the camera image generated may also be imaged or projected merely onto a sub-area of the projection surface 32a.

In a further method step S3, continuous images of the projection surface 32a are generated by means of a mobile virtual camera 33.

In a further method step S4, the generated continuous images are output.

The virtual camera 33 has a set of camera parameters or is characterized by these camera parameters. Elements of the set of camera parameters comprise a camera position of the virtual camera 33 and an optical axis of the virtual camera 33. In FIG. 3, the virtual camera 33 is depicted in three configurations, which are characterized by a first set M1 of camera parameters with a corresponding camera position P1 and optical axis A1, a second set M2 of camera parameters with corresponding camera position P2 and optical axis A2, and a third set M3 of camera parameters with corresponding camera position P3 and optical axis A3. The first set M1 of camera parameters and the third set M3 of camera parameters are here firmly predetermined and correspond respectively to an initial configuration and final configuration of the virtual camera 33. The second set M2 corresponds to an auxiliary configuration, which enables correct interpolation between the initial configuration and final configuration. Camera positions P1 to P3 of the first to third sets M1 to M3 are located on a great circle, which extends on a surface 32b of an upper hemisphere of the sphere 32. This surface 32b indicates the possible camera positions of the virtual camera 33, i.e. the virtual camera 33 is in principle freely displaceable or mobile on the surface 32b. The camera position may then be stated for example by stating coordinates x, y, z of the surroundings model 31. The camera position is preferably stated by spherical coordinates r, θ, φ, wherein r corresponds to the radius of the sphere 32, θ is the polar angle and φ is the azimuth angle. According to one embodiment, the optical axis may be determined by corresponding Euler angles. The optical axis is preferably described by a quaternion.

A motion path W between the initial configuration and final configuration is divided into a first motion path W1 between camera position P1 of the first set M1 and camera position P2 of the second set M2 and into a second motion path W2 between camera position P2 of the second set M2 and camera position P3 of the third set M3. Camera position P2 of the second set M2 is determined by one point of the motion path W and preferably lies in a middle third of that circle segment of the corresponding great circle given by the motion path W. Camera position P2 of the second set M2 particularly preferably lies on the midpoint of the motion path W.

Figure 4:
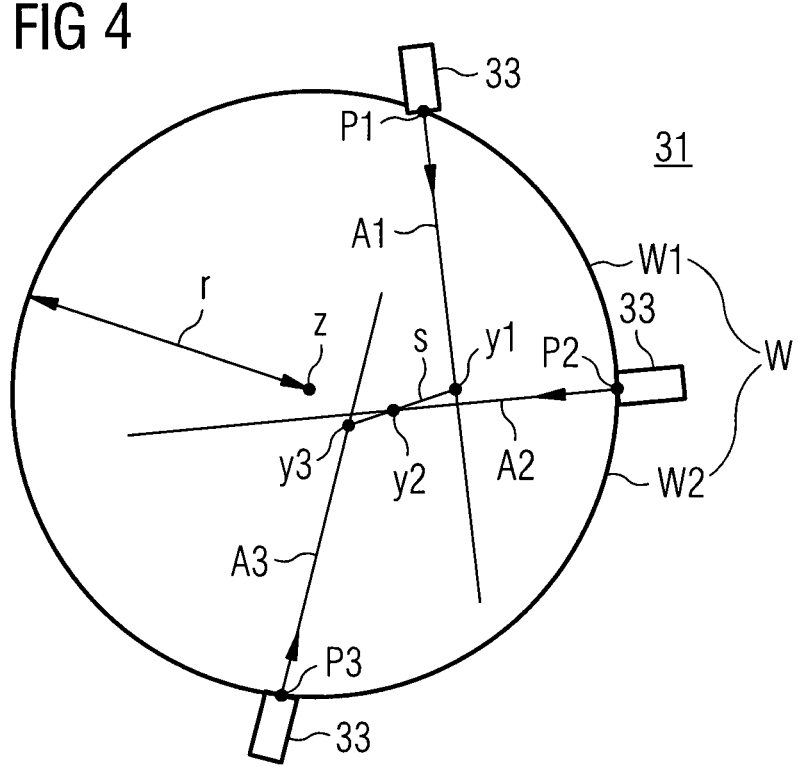
FIG. 4 shows a schematic cross-sectional view of the surroundings model for explaining the method according to the invention.

FIG. 4 shows a schematic cross-sectional view of the surroundings model 31 along the great circle containing motion path W. Greater detail will be given below as to the determination of optical axis A2 of the second set M2. In this respect, a first reference point y1 is predetermined or determined which lies on optical axis A1 of the first set M1. The first reference point y1 is preferably at a distance from camera position P1 of the first set M1 which substantially corresponds to a radius r of the sphere 32.

A second reference point y3 is further determined which is a predetermined point on optical axis A3 of the third set M3 of camera parameters. The distance of the second reference point y3 from camera position P3 of the third set M3 preferably corresponds to the distance of the first reference point y1 from camera position P1 of the first set M1 and is preferably likewise substantially equal to the radius r of the sphere 32.

An axis point y2 is further determined which lies on the connecting line S between the first reference point y1 and the second reference point y3. The axis point y2 preferably lies substantially in the middle of the connecting line S between the first reference point y1 and the second reference point y3.

The camera parameters of the virtual camera 33 are then continuously interpolated between the initial configuration and the final configuration. To this end, the set of camera parameters along the first motion path W1 in the surroundings model 31 is interpolated continuously between the first set M1 and second set M2 of camera parameters and, along the second motion path W2, the set of camera parameters is interpolated continuously between the second set M2 and third set M3 of camera parameters. The camera position of the mobile virtual camera 33 along the first and/or second motion path W1, W2 is here preferably established by spherical linear interpolation, SLERP.

The optical axis of the mobile virtual camera along the first and/or second motion path W1, W2 is further preferably established by spherical linear interpolation, SLERP, wherein the optical axis is preferably represented as a quaternion.

According to a further embodiment, the camera parameters further comprise an aperture angle, wherein the aperture angle is interpolated along the first motion path between a first aperture angle x1 of the first set M1 of camera parameters and an aperture angle x2 of the second set M2 of camera parameters and the aperture angle is interpolated along the second motion path W2 between the aperture angle x2 of the second set M2 of camera parameters and an aperture angle x3 of the third set M3 of camera parameters. Interpolation is here preferably performed linearly. The aperture angle of the first set M1 and the second set M2 is preferably in each case predetermined and the aperture angle x2 of the second set is determined by linear interpolation.

The effect of the invention is explained in greater below on the basis of the cross-section of the surroundings model 31 shown in FIG. 5. Here, the initial configuration is likewise predetermined by the first set M1 of camera parameters and the final configuration by the third set M3 of camera parameters. If the camera position is then interpolated by spherical linear interpolation between camera position P1 of the first set M1 and camera position P3 of the third set M3 and at the same time the optical axis of the virtual camera 33 is interpolated between the first axis A1 of the first set M1 and the third axis A3 of the third set M3 by means of spherical linear interpolation, the case illustrated in FIG. 5 may then arise that an optical axis A2' of the virtual camera 33 points outside the sphere 32 in the case of a camera position P2 between camera position P1 of the first set M1 and camera position P3 of the third set M3 and thereby makes image generation by the virtual camera 33 difficult or indeed impossible. The reason for this configuration is that the shortest connection between the optical axis A1 of the first set M1 and the optical axis A3 of the third set M3 corresponds to an interpolation which proceeds by rotating the optical axis away from the center z.

Figure 5:
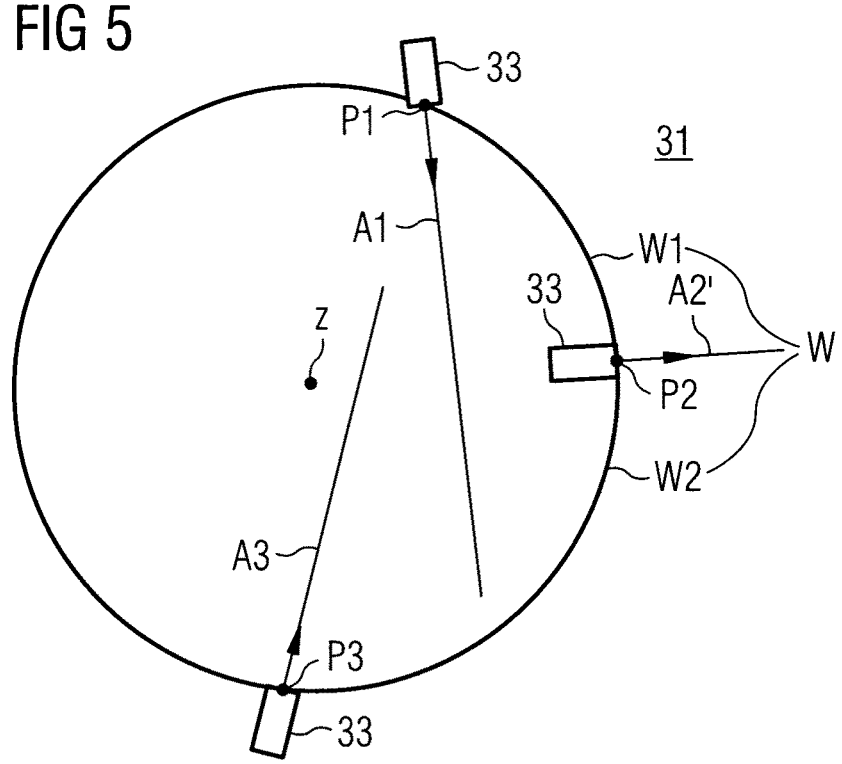
FIG. 5 shows a schematic cross-sectional view of a surroundings model for explaining a scenario avoided by the method according to the invention.

The situation illustrated in FIG. 5 is prevented according to the invention in that the second set M2 of camera parameters is determined, the optical axis A2 or capture direction of which is correctly oriented, i.e. oriented in the direction of the center z. It is thus possible to generate continuous images of the three-dimensional surroundings model 31.

The continuous images of the projection surface 32a are generated by the virtual camera 33 moving along motion path W and having the camera parameters generated by the interpolation.

According to one preferred embodiment, the continuous images are output to a driver assistance system which controls functions of the vehicle. The driver assistance system may for example perform a parking operation partially or wholly autonomously on the basis of the images of the surroundings model 31.

According to one further embodiment, the continuous images are displayed to a driver of the vehicle on a display device.

Figure 6:
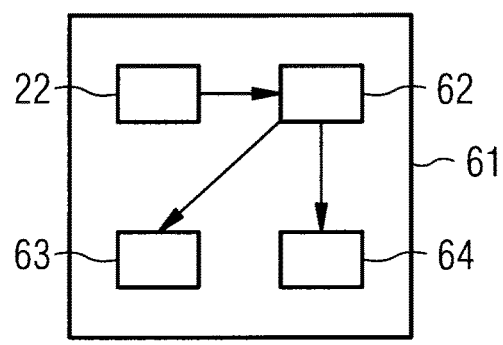
FIG. 6 shows a schematic block diagram of a vehicle control system according to one embodiment of the invention.

FIG. 6 shows a block diagram of a vehicle control system 61 of a vehicle 21 for generating continuous images of a stored three-dimensional surroundings model 31 of the vehicle 21 according to one embodiment of the invention. The vehicle control system 61 includes a camera device 22 of the vehicle 21, which device may comprise one or more vehicle cameras. The vehicle control system 61 further comprises a computing device 62 which is configured to project the camera image generated onto a projection surface in the stored three-dimensional surroundings model 31 of the vehicle. The surroundings model 31 may preferably be stored on a memory device of the vehicle control system 61 or provided to the computing device 62 via a network. The surroundings model 31 may contain further information which is provided to the vehicle control system 61 in particular by distance sensors, radar sensors, infrared images or LiDAR sensors of the vehicle.

The computing device 62 is further configured to generate continuous images of the projection surface 32a by means of a mobile virtual camera 33. The virtual camera 33 here moves along a motion path W which has a first motion path W1 and a second motion path W2. The virtual camera 33 has a set of camera parameters, the elements of which comprise a camera position of the virtual camera 33 and an optical axis of the virtual camera 33.

The computing device 62 is configured to interpolate the set of camera parameters along the first motion path W1 in the surroundings model 31 continuously between a predetermined first set M1 of camera parameters and a predetermined second set M2 of camera parameters. The computing device 62 is further configured to interpolate the set of camera parameters of the virtual camera 33 along the second motion path W2 in the surroundings model 31 continuously between the second set M2 of camera parameters and a predetermined third set M3 of camera parameters. The first set M1 and the third set M3 of camera parameters are predetermined and correspond to initial and final configurations of the virtual camera 33. Camera position P2 of the second set M2 of camera parameters corresponds to a point on motion path W which may be determined in particular by connecting camera position P1 of the first set M1 and camera position P3 of the third set M3 by means of a great circle illustrated in FIG. 31 by the computing device 62.

The computing device is configured to specify the optical axis A2 of the second set M2 of camera parameters in such a way that it runs through a predetermined axis point y2 which lies on a connecting line S between a first reference point y1 and a second reference point y3. The first and second reference points y1, y3 respectively here correspond to a predetermined point of the optical axis A1, A2 of the first set M1 and third set M3 respectively. In particular, the computing device 62 may specify the second set M2 of camera parameters in accordance with the above-described method.

The vehicle control system 61 further comprises an output device 63 which is configured to output the generated continuous images. The output device 63 may have an interface, in particular a cable connection, a USB interface or a wireless interface. The images generated may in particular be transmitted via the output device 63 to further equipment or via car-to-car communication to further vehicles.

The vehicle control system 61 preferably further comprises a driver assistance system 64 which is configured to control a function of the vehicle 21 on the basis of output continuous images.

The output device 63 optionally further comprises a display device, for instance a vehicle display, which is configured to display the output continuous images to a driver of the vehicle.

Figure 7:
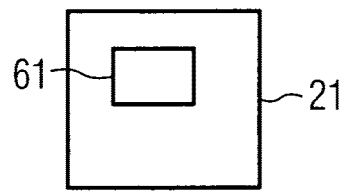
FIG. 7 shows a schematic block diagram of a vehicle according to one embodiment of the invention.

FIG. 7 shows a block diagram of a vehicle 21 with a vehicle control system 61, in particular according to one of the above-described embodiments of the invention.

LIST OF REFERENCE NUMERALS

21 Vehicle
22 Camera device
22a to 22d Vehicle cameras
31 Surroundings model
32 Sphere
32a Projection surface
32b Surface of the upper hemisphere of the sphere
33 Virtual camera
61 Vehicle control system
62 Computing device
63 Output device
64 Driver assistance system
A1 Optical axis of the virtual camera of the first set
A2 Optical axis of the virtual camera of the second set
A3 Optical axis of the virtual camera of the third set
P1 Camera position of the virtual camera of the first set
P2 Camera position of the virtual camera of the second set
P3 Camera position of the virtual camera of the third set
r Radius of the sphere
S Connecting line
W Motion path
W1 First motion path
W2 Second motion path
x1 Aperture angle of the virtual camera of the first set
x2 Aperture angle of the virtual camera of the second set
x3 Aperture angle of the virtual camera of the third set
y1 First reference point
y2 Axis point
y3 Second reference point
z Center of the sphere

The invention claimed is:

1. A method of generating continuous images of a stored three-dimensional surroundings model of a vehicle, comprising steps:

generation of at least one camera image by a camera device of the vehicle;

projection of the camera image onto a projection surface in the stored three-dimensional surroundings model of the vehicle;
generation of continuous images of the projection surface by a mobile virtual camera; and
output of the continuous images;
wherein the mobile virtual camera, for each respective current configuration of the mobile virtual camera, respectively has a current set of camera parameters, including a respective camera position of the mobile virtual camera and a respective optical axis of the mobile virtual camera in the respective current configuration of the mobile virtual camera;
wherein, along a first motion path in the stored three-dimensional surroundings model, the current set of camera parameters is interpolated continuously between a predetermined first set of camera parameters and a second set of camera parameters and, along a second motion path in the stored three-dimensional surroundings model, the current set of camera parameters is interpolated continuously between the second set of camera parameters and a predetermined third set of camera parameters; and
wherein an optical axis of the mobile virtual camera included in the second set of camera parameters runs through a predetermined axis point which lies on a connecting line between a first reference point and a second reference point, wherein the first reference point is a predetermined point on an optical axis of the mobile virtual camera included in the first set of camera parameters and the second reference point is a predetermined point on an optical axis of the mobile virtual camera included in the third set of camera parameters.

2. The method according to claim 1, wherein the first motion path and the second motion path describe a segment of a circle in the stored three-dimensional surroundings model.

3. The method according to claim 2, wherein the interpolation of the camera position of the mobile virtual camera along the first motion path and/or along the second motion path is performed by spherical linear interpolation.

4. The method according to claim 2, wherein the interpolation of the optical axis of the mobile virtual camera along the first motion path and/or along the second motion path is performed by spherical linear interpolation.

5. The method according to claim 2, wherein a camera position included in the second set of camera parameters lies in a middle third of the segment of the circle.

6. The method according to claim 5, wherein the camera position included in the second set of camera parameters lies at a midpoint of the segment of the circle.

7. The method according to claim 1, wherein a distance of the first reference point from a camera position included in the first set of camera parameters is substantially equal to a distance of the second reference point from a camera position included in the third set of camera parameters.

8. The method according to claim 1, wherein the predetermined axis point lies substantially at a middle of the connecting line between the first reference point and the second reference point.

9. The method according to claim 1, wherein a driver assistance system controls a function of the vehicle based on the continuous images.

10. The method according to claim 1, wherein the continuous images are displayed to a driver of the vehicle on a display device.

11. A vehicle control system of a vehicle for generating continuous images of a stored three-dimensional surroundings model of the vehicle, comprising:
a camera device of the vehicle for generating at least one camera image;
a computing device, which is configured to project the camera image onto a projection surface in the stored three-dimensional surroundings model of the vehicle, and to generate continuous images of the projection surface by a mobile virtual camera; and
an output device which is configured to output the continuous images,
wherein the mobile virtual camera, for each respective current configuration of the mobile virtual camera, respectively has a current set of camera parameters, including a respective camera position of the mobile virtual camera and a respective optical axis of the mobile virtual camera in the respective current configuration of the mobile virtual camera;
wherein the computing device is configured to interpolate the current set of camera parameters, along a first motion path in the stored three-dimensional surroundings model, continuously between a predetermined first set of camera parameters and a second set of camera parameters and, along a second motion path in the stored three-dimensional surroundings model, continuously between the second set of camera parameters and a predetermined third set of camera parameters, and
wherein the computing device is further configured to determine an optical axis of the mobile virtual camera included in the second set of camera parameters as running through a predetermined axis point which lies on a connecting line between a first reference point and a second reference point, wherein the first reference point is a predetermined point on an optical axis of the mobile virtual camera included in the first set of camera parameters and the second reference point is a predetermined point on an optical axis of the mobile virtual camera included in the third set of camera parameters.

12. The vehicle control system according to claim 11, wherein the first motion path and the second motion path describe a segment of a circle in the stored three-dimensional surroundings model.

13. The vehicle control system according to claim 11, wherein the computing device is configured to interpolate the camera position of the mobile virtual camera along the first motion path and/or along the second motion path by spherical linear interpolation.

14. The vehicle control system according to claim 11, with a driver assistance system which is configured to control a function of the vehicle based on the continuous images.

15. The vehicle control system according to claim 11, wherein the output device comprises a display device which is configured to display the continuous images to a driver of the vehicle.

16. A vehicle with a vehicle control system according to claim 11.

* * * * *